June 16, 1936.    H. J. SMITH    2,044,127
CONTROL BY INTEGRATION
Filed Feb. 17, 1933    6 Sheets-Sheet 1
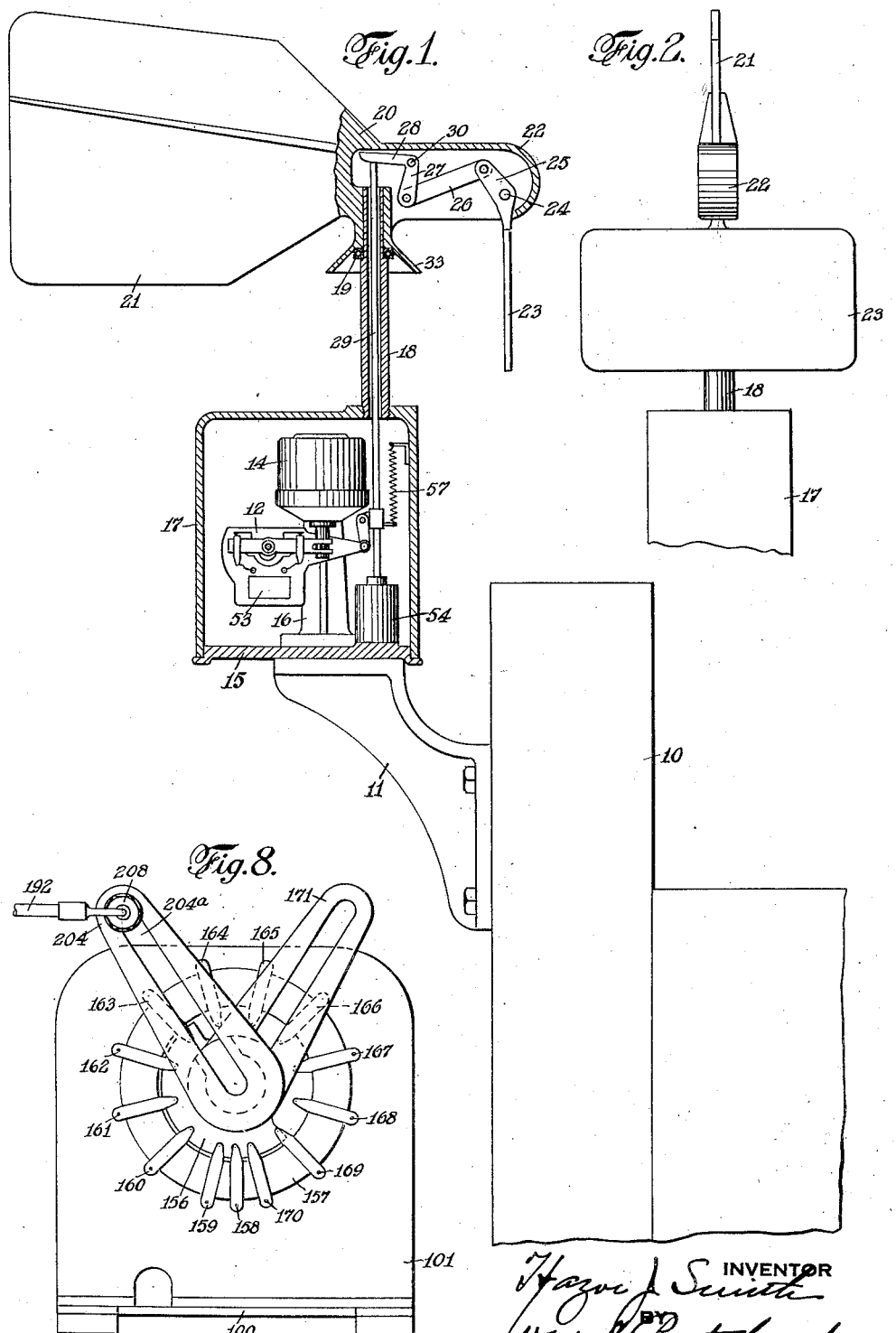

June 16, 1936.  H. J. SMITH  2,044,127

CONTROL BY INTEGRATION

Filed Feb. 17, 1933    6 Sheets-Sheet 3

INVENTOR
BY
ATTORNEY

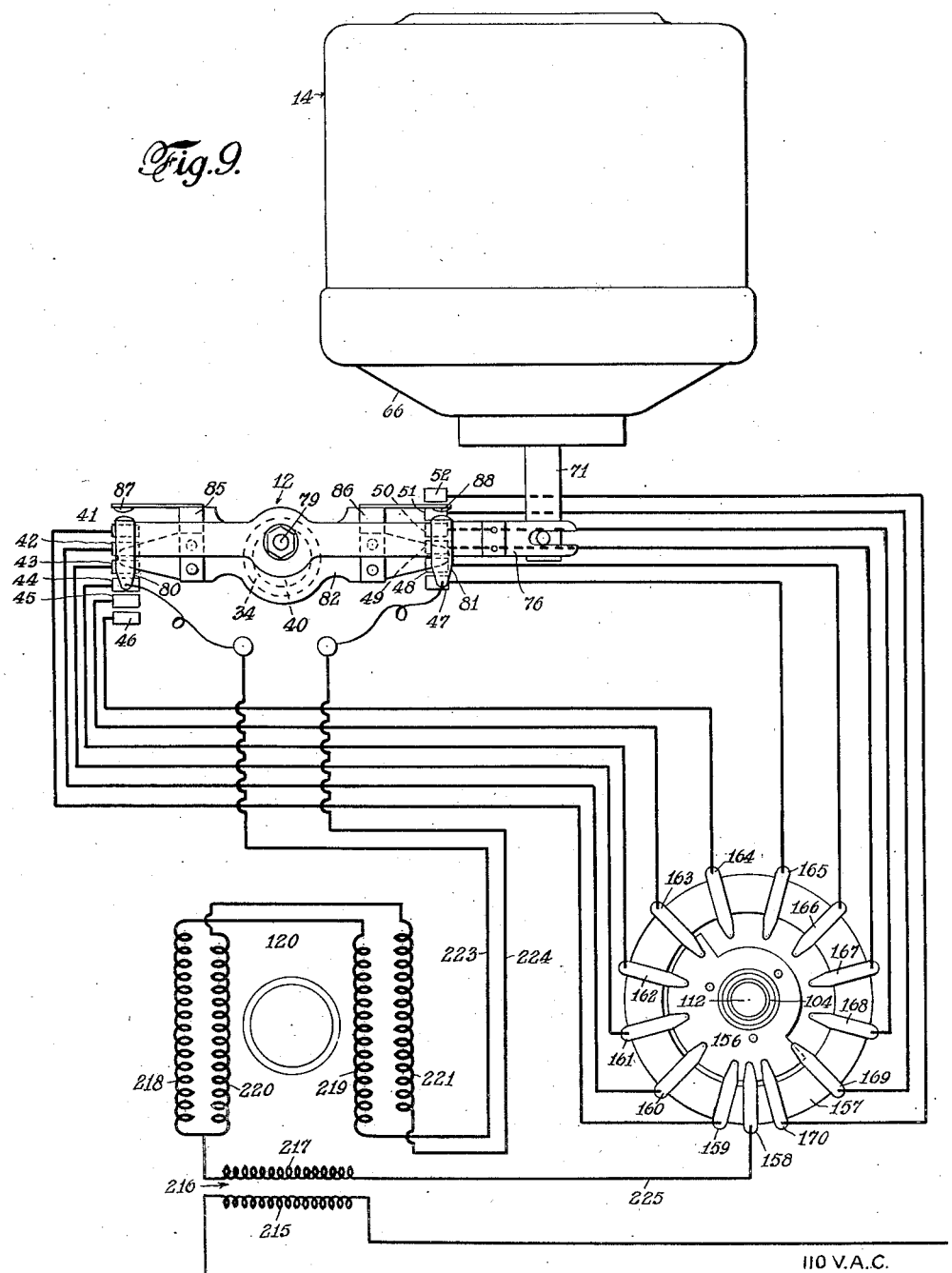

June 16, 1936.  H. J. SMITH  2,044,127
CONTROL BY INTEGRATION
Filed Feb. 17, 1933   6 Sheets-Sheet 5
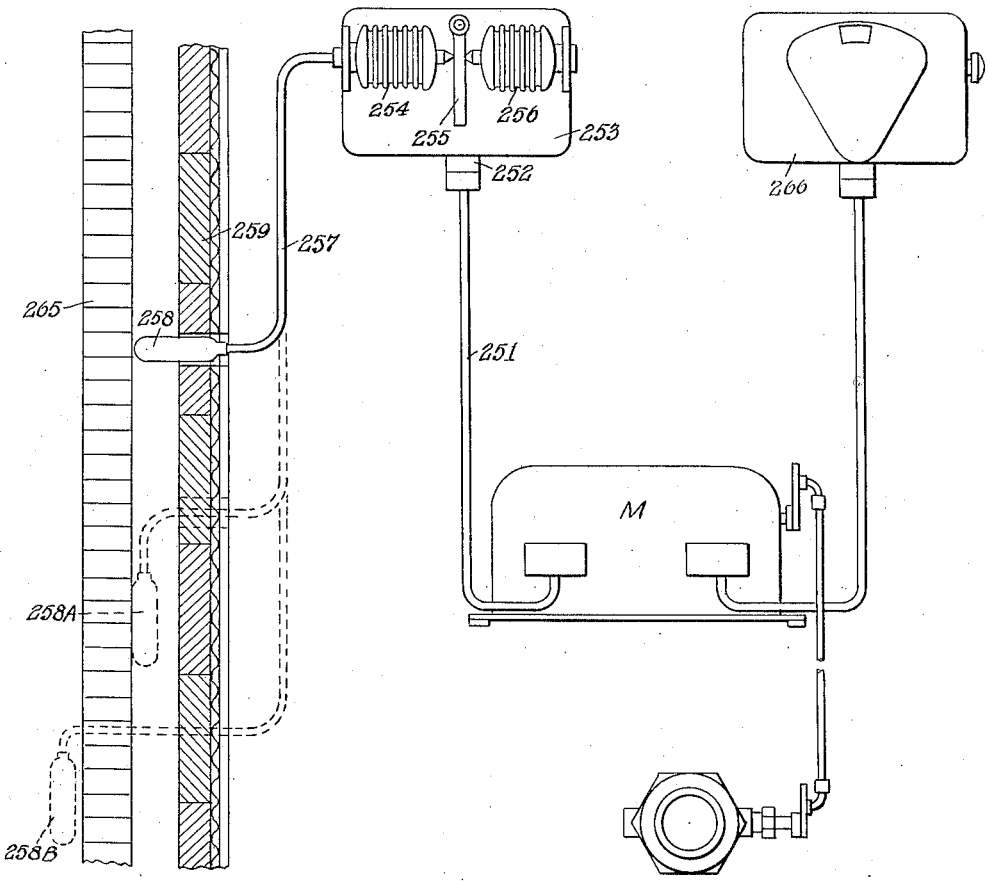
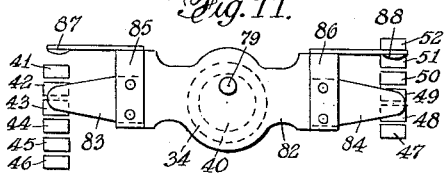
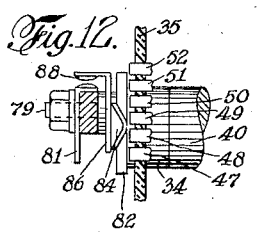
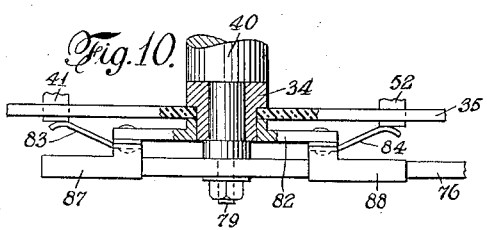

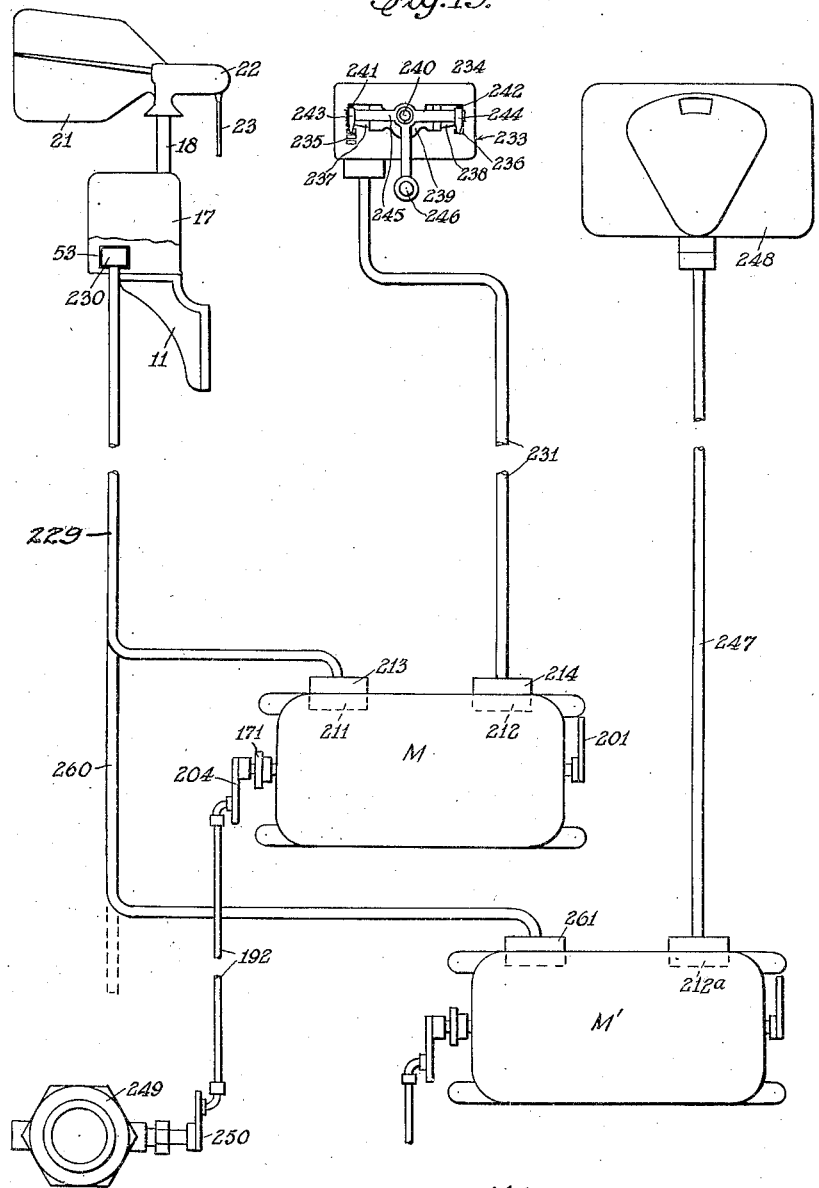

Patented June 16, 1936

2,044,127

UNITED STATES PATENT OFFICE 2,044,127

CONTROL BY INTEGRATION

Hazor J. Smith, Springfield, Mass., assignor to Superstat Company, Springfield, Mass., a corporation of Massachusetts Application February 17, 1933, Serial No. 657,237

13 Claims. (Cl. 236—91)

This invention relates to a condition-control apparatus, and more particularly to an apparatus for controlling a condition in response to the combined effect of a plurality of separate factors.

The invention is particularly applicable to the control of the heat supply to a building or to a part of a building and for this purpose the control is effected in response to the various factors which determine the heat requirements. Such factors include the inside temperature, the outside temperature, wind velocity and sunlight.

Assuming for example, a zero outside temperature and a 70° inside temperature with no sun and no wind, the heating differential is 70°. If the sun shines brightly on a wall of the building, the absorption of radiant heat by the wall may be sufficient to reduce the heat load by as much as 20%. This would have the same effect on the heat requirements as though the outside temperature rose as much as 14°. On the other hand, with a zero outside temperature, no sun and a forty-mile wind, the heat requirements may be increased as much as 40%, which would correspond to the heat required on a still day with an outside temperature of 28° below zero. It is evident, therefore, that sunlight and wind are important factors, in conjunction with the outside temperature, in determining the amount of heat supply required to maintain a given inside temperature.

It is accordingly an object of the present invention to provide a condition-control device which is operable in response to the combined effect of the various factors determining the condition.

Another object is to provide a heat control which is responsive to outside weather conditions.

A further object is to provide a control of the above type which is responsive to the combined effect of the outside weather conditions and the inside temperature.

A more specific object is to control the heat supply to a building in accordance with the outside temperature, sunlight and wind velocity and to modify the control, if desired, in accordance with the inside temperature.

A still further object of the invention is to provide a sensitive, convenient and dependable apparatus for the purpose above indicated.

The invention also consists in certain new and original types of construction and combinations of parts hereinafter set forth and claimed.

A feature of the invention is a master control for the heat supply to a building or to a unit which automatically supplies the amount of heat required by the outside weather conditions to maintain a given inside temperature. As applied to a steam supply, the master control varies the volume and pressure of the steam so as to supply a controlled amount to the building and to thereby avoid overheating and consequent waste of steam when weather conditions change.

In a large building, it is impractical to automatically control all of the radiators. There is a tendency to allow the radiators to remain open and to control the temperature by opening or closing the windows. In accordance with the present invention, the radiators may be set for the desired temperature and thereafter the steam supply is varied in accordance with heat requirements. Hence, the inside temperature will remain substantially constant without further adjustment of the radiators. It is obvious that the steam is more efficiently utilized and a saving in steam consumption as well as a more uniform inside temperature are effected.

In certain instances, the master control may be modified by an inside thermostat to provide a particularly fine control of the inside temperature. The inside control may also serve as a convenient adjustment for the master control.

The invention is also applicable to air-conditioning apparatus and provides a control in accordance with the combined inside temperature and outside temperature or outside weather.

It may also be applied to fresh air and recirculating heating combinations to provide a control for the fresh air in accordance with the outside weather, for the recirculated air in accordance with the inside temperature, and for the heat supply in accordance with the combined effect of the outside weather and the inside temperature.

The above examples are merely illustrative of the various embodiments of the invention. Many others will be apparent to a person skilled in the art.

Although the novel features which are believed to be characteristic of this invention will be particularly pointed out in the claims appended hereto, the invention itself, as to its objects and advantages and the manner in which it may be carried out, may be better understood by referring to the following description taken in connection with the accompanying drawings forming a part thereof, in the various figures of which like reference characters have been used to designate like parts.

In the drawings which illustrate certain embodiments of the invention:

Figure 1 is a side elevation, partly in section, of the weather integrator;

Figure 2 is a partial front elevation of the device shown in Figure 1;

Figure 8 is an end elevation of the motor-control unit taken from the left of Figure 4;

Figure 9 is a schematic diagram showing the electrical connections to the various units;

Figure 10 is a detail view of the control switch;

Figure 11 is a detail view of the switch arm and cooperating contacts;

Figure 12 is a section taken on the line 12—12 of Figure 3;

Figure 13 is a diagrammatic representation of the complete system; and

Figure 14 is a diagrammatic representation of a system illustrating a different embodiment of the invention.

Figure 3:
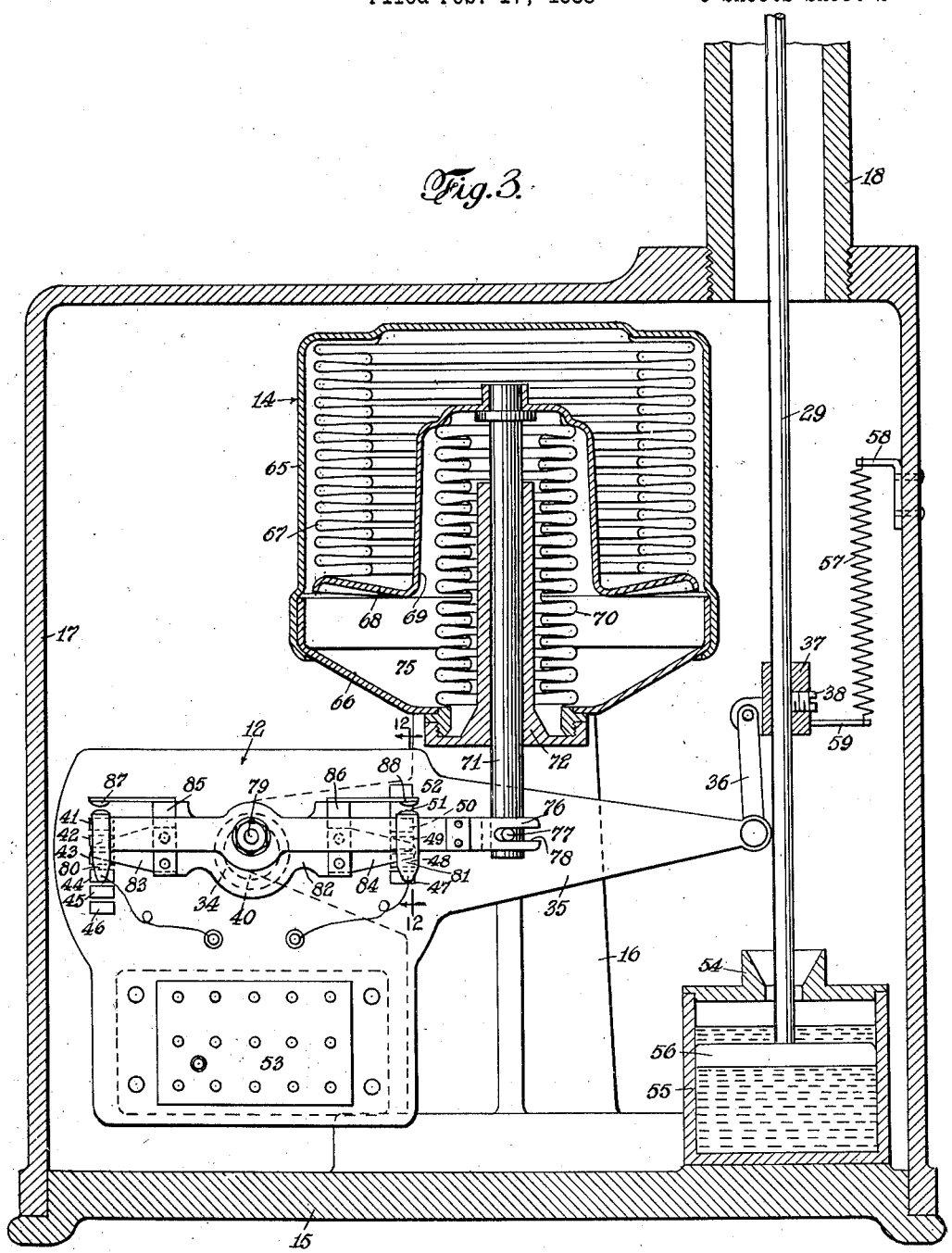
Figure 3 is a longitudinal sectional view of the temperature-responsive element and the control switch.
Figure 4:
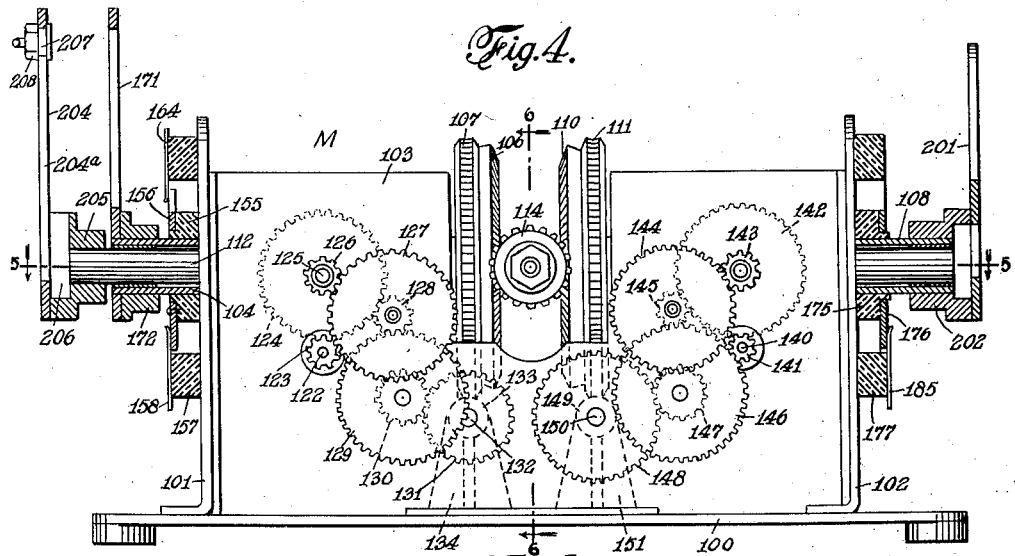
Figure 4 is a side elevation of the motor-control unit.
Figure 5:
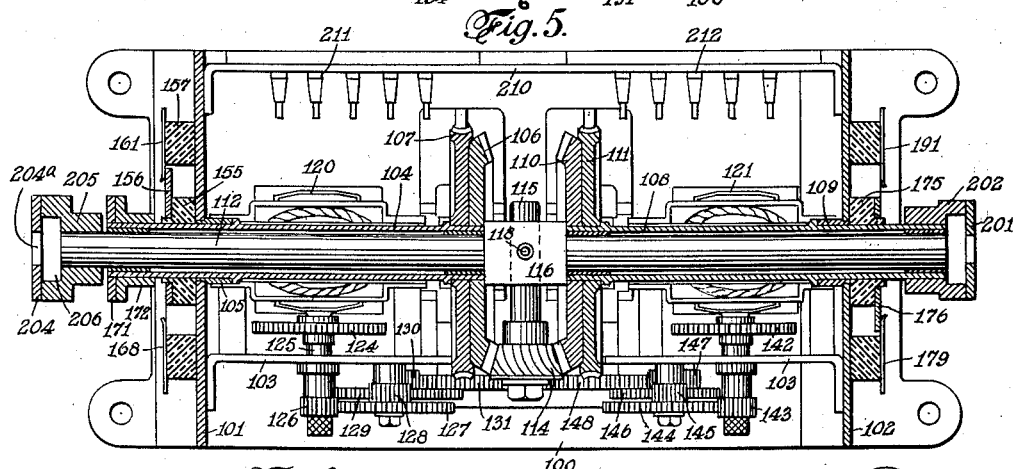
Figure 5 is a section taken on the line 5—5 of Figure 4.
Figure 6:
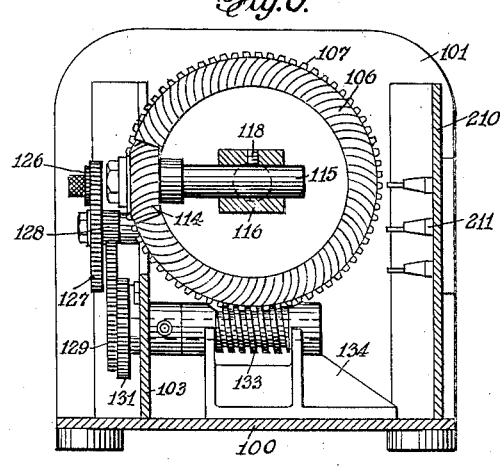
Figure 6 is a section taken on the line 6—6 of Figure 4.
Figure 7:
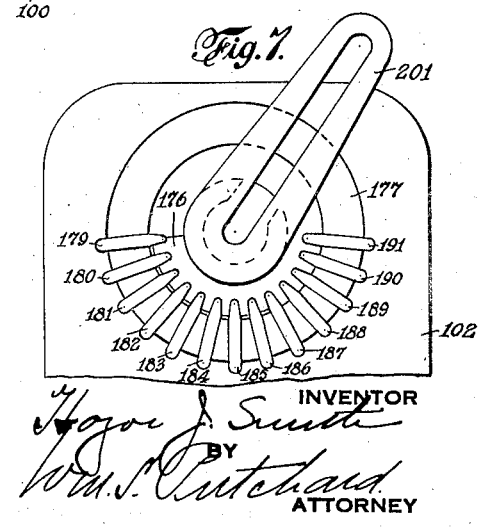
Figure 7 is an end elevation of the motor-control unit taken from the right of Figure 4.

Referring to the embodiment of the invention disclosed in the drawings, the weather integrator is illustrated in Figures 1 to 3 as comprising a base 15 carrying a bracket 16, which supports a temperature-responsive device 14 and a control switch 12 to be described. The base 15 also supports a housing 17 to which is secured an elongated tubular member 18 having a bearing 19 on which a wind-vane housing 20 is rotatably mounted. The housing 20 is formed at its rear end with a vertical direction vane 21 and at its front end carries a shield 22 within which a wind-pressure vane 23 is pivoted, as by pivot 24. The wind-pressure vane extends normal to the plane of the direction vane, whereby the vane 23 may be moved about the pivot 24 in response to the wind pressure on the surface thereof.

The vane 23 carries a lever 25, which is connected by a link 26 to a bell-crank lever 27 pivoted to the shield 22 by a pivot 30 and having an arm 28 engaging a plunger 29, which extends through the tubular member 18. The housing 20 is provided with a hood 33 by which the bearing 19 and the interior of the housing 17 are protected from the elements. The wind-vane housing 20 is free to rotate on the member 18 so that the direction vane 21 can at all times maintain the wind-pressure vane 23 normal to the wind direction. The base 15 may be supported by a bracket 11 on the outside wall 10 of a building.

Referring to Figures 3 and 10 to 12, the control switch 12 is shown as including a switch plate 35, which is connected to the plunger 29 by means of a link 36 and a collar 37 having a set screw 38. The plate 35 is pivoted by a bushing 34 (Figure 10) about a pin 40, which is secured to the bracket 16. The plate 35 carries a set of hot contacts 41—46 and a set of cold contacts 47—52, which are connected by suitable connecting means (not shown) to a multiple socket 53.

The plunger 29 at its lower end is connected to a dash pot 54, comprising a cylinder 55 and a piston 56, which is adapted to operate in oil or other suitable medium for damping purposes. A spring 57 is anchored between a bracket 58, secured to the housing 17, and a pin 59, carried by the collar 37, and is adapted normally to maintain the plunger 29 in an elevated position but to permit said plunger to be depressed in response to movement of the wind-pressure vane 23 which is caused by wind pressure thereon.

The spring 57 (Figure 3) which resists the downward movement of the plunger 29 is arranged to have a modulus approximately equal to the curve of added heat demand for wind velocity. This curve is a combined curve of low increase up to approximately 15 miles per hour and of rapid increase between approximately 15 and 40 miles per hour, flattening out somewhat above this figure. The device is accordingly constructed to interpret the wind velocity into motion of the switch plate 35, according to this curve, and may have approximately 40 miles per hour wind velocity as the top limit.

The temperature-responsive device 14 is shown in Figure 3 as comprising a housing 65, which is mounted on the bracket 16 by suitable means (not shown) and is sealed by a cap 66. An expansible metallic bellows 67, having a comparatively stiff cover 68 hermetically sealed thereto to form a variable pressure chamber, is mounted within the housing 65. A plunger 71 is rigidly secured to the cover 68 and extends through a bushing 72 carried by the cap 66. A second metallic bellows 70 is seated in a recess 69 in the cover 68 and is secured between the cap 66 and the plunger 71 to form a glandless seal for the plunger. The bellows 70 also serves in conjunction with the cover 68 and the bellows 67 to form a hermetically sealed balancing chamber 75 within the housing 65 and external to the bellows 67.

The bellows 67 is preferably charged with a substance having a substantial change in vapor pressure within the temperature range involved in the operation of the device. The amount of the charge is preferably such that the vapor remains saturated only throughout the operating range, inasmuch as the differential change in vapor pressure of the saturated vapor with respect to temperature is greater than the differential change in gas pressure of the unsaturated vapor.

Various substances may be employed for this purpose, depending upon the operating range of the instrument. Methyl chloride has been found suitable for an outdoor thermostat. Isobutane, butane, ethyl chloride, sulphuric ether, carbon tetrachloride and alcohol are examples of other substances which may be used at appropriate operating ranges.

The relationship between the size, gas pressure and change of volume of the balancing chamber 75 is preferably such that the pressure-volume curve of the gas within the chamber follows the pressure-temperature curve of the substance within the bellows 67. Adjustment for this purpose may be made by varying the ratio of the maximum and minimum volumes of the chamber 75 in the selected operating range of the device. In one embodiment of the invention, this is accomplished by introducing a quantity of a liquid, such as alcohol, into the chamber. The liquid decreases the effective volume of the chamber without changing the flexibility of the bellows and thereby increases the volume ratio of the chamber. By this means, the minimum volume may be adapted to any desired operating range. The liquid may be introduced by any suitable means (not shown).

The arrangement is such that the internal pressure within the bellows 67 does not differ greatly from the internal pressure within the chamber 75. It is possible, therefore, to utilize a bellows of extreme sensitivity because of the relatively small pressure differential to which it is subjected. The bellows 67 may accordingly be formed with a comparatively thin wall and may be made much more flexible and sensitive than would be the case if it were exposed externally to the atmosphere. The bellows 70 is of small diameter and of comparatively great length and may accordingly be made to withstand the difference between the pressure in the chamber 75 and the pressure of the outside atmosphere without being unduly rigid.

With a gain in temperature, the pressure of the methyl chloride or other substance within the bellows 67 rises and the bellows expands to equalize this pressure against the pressure in the chamber 75, thereby producing a downward motion of the plunger 71. Upon a fall in temperature, the reverse action takes place.

The plunger 71 is connected to a lever 76, as by a pin 77 engaging the slot 78 in said lever (Figure 3). The lever 76 is pivoted about an eccentric stud 79 on the pin 40 and carries a pair of contact members 80 and 81 (Figures 3, 10 and 12). A switch arm 82 is pivoted about the bushing 34 on the pin 40 and carries contact brushes 83 and 84 adapted to engage hot contacts 41—46 and cold contacts 47—52 respectively. The brushes 83 and 84 are connected to conductors 85 and 86, which are in turn connected to contacts 87 and 88 respectively (Figure 11). Contacts 87 and 88 are adapted to engage the contacts 80 and 81 respectively of the lever 76 to form a reversing switch.

It will be noted that in the above construction movement of the plunger 71 causes pivotal movement of the lever 76, thereby closing contacts 80 and 87 or contacts 81 and 88, depending upon the direction of movement. After one of the above sets of contacts has been closed, further movement of the lever 76 causes pivotal movement of the arm 82 and thereby causes the brushes 83 and 84 to move over the hot and cold contacts carried on the plate 35. The eccentric mounting of the lever 76 with respect to the arm 82 produces a wiping action between the contacts 80 and 81 and the contacts 87 and 88 respectively adapted to maintain the contacts in clean condition.

In the embodiment disclosed, the relationship between the parts is such that the plunger 71 is capable of a range of movement corresponding to a part only of the hot and cold contacts. The remaining hot and cold contacts are brought into operation by movement of the plate 35 caused by movement of the plunger 29 in response to wind pressure exerted upon the vane 23. It is obvious that the relationship between the movement of the plunger 71 and of the plunger 29 may be varied and that the operating range of the instrument and the number of progressive hot and cold contacts may also be varied as desired. The dashpot 54 preferably retards the movement of the plunger 29 sufficiently to prevent short gusts of wind or minor variations in wind pressure from affecting the device and renders the device responsive only to sustained changes in wind pressure.

The bellows 67 is responsive to the temperature variations and operates accordingly. If the device is so located that the housing 17 is exposed to the rays of the sun, radiant heat will be absorbed by said housing and transferred to the air within the housing, which is correspondingly heated and exerts an influence upon the action of the bellows 67. If the above-described mechanism is mounted on the outside of a building in such a position that the vane 23 is exposed to the wind and the housing 17 is exposed to the direct rays of the sun, it is evident that the combined effect of wind, outside temperature and sunlight will be integrated by the device and will determine the position of the brushes 83 and 84 with respect to the hot and cold contacts 41—46 and 47—52 respectively.

The motor-control unit M illustrated in Figures 4 to 8 comprises a base plate 100 carrying a pair of end plates 101, 102. A front supporting plate 103 is mounted between end plates 101 and 102 and serves as a support for the gear trains to be described. A sleeve 104 is mounted in a bearing 105 in the end plate 101 and carries at one end a beveled gear 106 and a worm gear 107. A sleeve 108 is mounted in a bearing 109 in the end plate 102 and carries at one end a beveled gear 110 and a worm gear 111. A shaft 112 is journaled within the sleeves 104 and 108 and extends entirely through the device in a longitudinal direction. Said shaft is supported in suitable bearings in sleeves 104 and 108 and serves to maintain said sleeves in alignment and to support the free ends thereof. The beveled gears 106 and 110 are located at the center of the device and cooperate with a pinion 114 to form a differential. The pinion 114 is carried on a pin 115, which is in turn mounted in a block 116 secured to or formed integral with the shaft 112. The pin 115 may be held in the block 116 by a set screw 118. The angular position of the pin 115 and, consequently, of the shaft 112 is determined by the relative position of the beveled gears 106 and 110.

The beveled gears 106 and 110 are controlled by a pair of reversible electric motors 120 and 121 respectively through gear trains to be described.

The motor 120 is provided with a shaft 122 carrying a pinion 123 meshing with a gear 124, which is carried on a shaft 125 journaled in the front plate 103. The shaft 125 carries a pinion 126, meshing with a gear 127, having a pinion 128, which engages a gear 129. The gear 129 is provided with a pinion 130 engaging a gear 131 carried on a shaft 132. Said shaft 132 carries a worm 133 engaging the worm gear 107. The various gears and pinions 127 to 130 are supported on suitable shafts, which are carried by the front plate 103. The shaft 132 is mounted on a bracket 134, which is carried by the base plate 100.

The motor 121 is provided with a shaft 140 carrying a pinion 141, which, through a gear train comprising a gear 142, pinion 143, gear 144, pinion 145, gear 146, pinion 147, gear 148 and worm 149 drives the worm gear 111. The various gears and pinions 142 to 147 are supported in suitable shafts carried by the front plate 103. The gear 148 and the worm 149 are carried on a shaft 150, which is journaled in a bracket 151 mounted on the base plate 100.

The sleeve 104 carries an insulating bushing 155 to which a commutator segment 156 (Figures 4, 5 and 8) is secured. An insulating ring 157 is mounted on the end plate 101 and carries a plurality of brushes 158 to 170, which are adapted to progressively engage said commutator segment 156. An insulating bushing 175, carrying a commutator segment 176, is secured to the sleeve 108, and an insulating ring 177 is mounted on the end plate 102 and carries brushes 179 to 191 (Figure 7), which are adapted to progressively engage the commutator segment 176. A plate 210 is supported between the end plates 101 and 102 and carries a pair of multiple sockets 211 and 212, which are respectively connected to the various brushes associated with the commutators 156 and 176.

The shaft 112 carries an arm 204 which is secured thereto by a bushing 205. The arm 204 has a longitudinal slot 204a (Figure 8) registering with a recess 206 formed in the bushing 205. A control linkage mechanism 192 may be secured to the arm 204 by a bushing 207, which seats in the slot 204a, and may be clamped to the arm 204 by suitable means, such as a nut 208. The bushing is slidable within the slot 204a and within the recess 206 for adjusting the effective lever arm and the motion of the linkage mechanism 192. The sleeves 104 and 108 also carry slotted arms 171 and 201 respectively, which may be secured thereto by bushings 172 and 202 and are adapted to receive suitable linkage mechanism for actuating a control apparatus.

It is to be noted that the position of the commutators 156 and 176, with respect to their cooperating brushes, and of beveled gears 106 and 110 is determined by the angular positions of the sleeves 104 and 108, which in turn are controlled by the motors 120 and 121 through the gear trains above described. The relative positions of the two beveled gears 106 and 110 determine the position of the pinion gear 114 and consequently control the position of the shaft 112 and of the arm 204.

The motors 120 and 121 are preferably similar in construction. The motor 120 is shown, for example, in Figure 9 as having a main field coil 215, which is directly connected to the A. C. line and is supplied with, for example, 110 volts. The coil 215 furnishes the magnetizing force for the pole pieces (not shown) of the motor. The coil 215 also forms the primary of a transformer 216 having a secondary coil 217 in induced relationship thereto and adapted to have a voltage induced therein differing from the voltage in the coil 215 (for example 30 volts). The pole pieces are provided with opposed pairs of shading coils 218, 219 and 220, 221, which are adapted to be selectively connected to the secondary 217 and, when energized, to cause rotation of the motor. The shading coils are oppositely wound and are connected so that the direction of rotation of the motor is determined by the particular pair of shading coils which is energized.

The shading coils 218, 219 are shown as connected in series, and shading coils 220, 221 are also connected in series. One side of the secondary 217 is connected in parallel to the two sets of shading coils and thence through leads 223 and 224 to contacts 80 and 81, which are carried on the lever 76. The contacts 41 to 46 are connected respectively to the brushes 159 to 164. The contacts 47 to 52 are connected respectively to the brushes 165 to 170. The brush 158 is connected by a lead 225 to the opposite side of the secondary 217, thereby completing the secondary circuit through the shading coils and through the above-mentioned contacts. The commutator 156 is adapted to engage the return brush 158 and, in its extreme positions, to extend under a complete set of brushes 159 to 164 or 165 to 170.

The commutator is preferably of such dimension and the brushes are so located that the angular positions of the commutator, when it breaks contact with the brushes 159 to 164 respectively, are intermediate the angular positions of the commutator when it breaks contact with the brushes 165 to 170 respectively. By this means, the number of positions of the operating mechanism are increased and the sensitiveness of the device is correspondingly increased.

In the operation of the above-described mechanism, an increase in temperature causes bellows 67 to expand, thereby causing downward movement of the plunger 71 and clockwise movement of the lever 76. This movement of the lever 76 first causes the contacts 80 and 87 to close and then by the force exerted on the contact 87 by the contact 80 causes clockwise movement of the arm 82 and thereby causes the brushes 83 and 84 to progressively engage the corresponding sets of contacts 46 to 41 and 52 to 47 in the order named. When the plate 35 is in its normal position, corresponding to zero wind pressure on the vane 23, the brushes 83 and 84 are adapted to engage the contacts 41 to 44 and 47 to 50. Wind pressure on the vane 23, however, depresses the plunger 29 and thereby causes clockwise movement of the plate 35 and brings the contacts 45 and 46 and the contacts 51 and 52 within the operating range of the brushes 83 and 84.

Upon a decrease in temperature, the bellows 67 contracts, the plunger 71 is elevated, and the reverse action takes place, causing the brushes 83 and 84 to progressively engage the contacts 41 to 46 and 47 to 52 in the order named. It is evident, therefore, that the position of the brushes with respect to their contacts is dependent upon both the temperature of the bellows 67 and upon the wind pressure.

A circuit may be completed from the secondary 217 through the shading coils 218, 219, lead 223, contacts 80 and 87, to the brush 83, thence through one of the sets of contacts 41 to 46, to one of the brushes 159 to 164, commutator 156, return brush 158 and return lead 225, back to the secondary. A circuit may also be completed from the secondary 217 through the shading coils 220, 221, lead 224, contacts 81 and 88, brush 84, one of the contacts 47 to 52, one of the brushes 165 to 170, commutator 156, return brush 158 and return lead 225.

The particular pair of shading coils which is energized depends upon whether contacts 80 and 87 or contacts 81 and 88 are closed. Inasmuch as the shading coils determine the direction of rotation of the motor, it is evident that the above-mentioned contacts serve as a reversing switch and cause the motor to rotate in one direction or the other.

Rotation of the motor causes corresponding movement of the commutator 156. The motor will continue to rotate until the commutator 156 breaks contact with the particular brush which happens to be connected in circuit at the time, thereby breaking the circuit from the secondary 217 to the shading coils. The apparatus preferably is adapted to exert sufficient drag upon the motor to bring the motor to rest when the shading coils are deenergized, but other breaking means may be employed if desired.

In the arrangement illustrated in Figure 9, closing of the hot contacts 80 and 87 and clockwise movement of the contact arm 82 are adapted to cause counterclockwise rotation of the commutator 156 and to progressively cause said commutator to break contact with the brushes 164 to 159 in the order named. When the commutator 156 has broken contact with all of the brushes 164 to 159, it will make contact with all of the brushes 165 to 170. When cold contacts 81 and 88 are closed and the arm 82 moves in a counterclockwise direction, the brushes 165 to 170 are selectively energized and the commutator 156 is caused to move in a clockwise direction and to selectively disengage said brushes in the order named. It is to be noted, therefore, that the direction of movement of the commutator 156 and of the motor 120 is determined by the reversing contacts 80, 87 and 81, 88, and the extent of movement of said commutator is determined by the brushes 83 and 84 and their cooperating contacts, which operate as progressive switches.

Movement of the arm 171 and of the beveled gear 106 takes place corresponding to the movement of the commutator 156. They are accordingly caused to occupy an angular position, determined by the position of the arm 82 and the brushes 83 and 84. The arm 171 may be connected to a suitable control device to regulate a condition in accordance with the integrated weather effect.

The connections are diagrammatically shown in Figure 13 as including a multiple conductor 229 having a jack 213 engaging the socket 211 of the motor-control unit M, and a second jack 230 engaging the socket 53 of the weather integrator.

The multiple conductor 229 may also have an extension 260 connected to a jack 261 engaging the socket of a second motor-control unit M' and connecting the same in parallel to the first motor-control unit M, whereby the two units are caused to operate from a single control device, such as the weather integrator above described. In a similar manner, any desired number of units may be operated from a single control device.

The socket 212 of the motor-control unit M may be connected by a multiple conductor 231 to a manual-adjusting switch 233, comprising a supporting plate 234, carrying sets of contacts 235, 236, engaging brushes 237 and 238 respectively, which are carried by an arm 239 pivoted to said plate 234 as by a pin 240. The arm 239 also carries contacts 241 and 242 adapted to engage contacts 243 and 244 respectively, which are carried by a second arm 245. The various parts are similar to those described in connection with the switch 12 of Figure 3. The thermostatic control of Figure 3, however, is replaced by a hand lever 246, which is associated with the arm 245 and permits the switch to be manually operated and set. The connections to the motor 121, brushes 179 to 191 and the contacts of the manual-adjusting switch 233 are similar to those illustrated in Figure 9 in respect to the motor 120, brushes 158 to 170 and the contacts of the thermostatic switch 12. Hence, the description thereof will not be repeated.

The corresponding socket 212a of the motor-control unit M' may be connected by a multiple conductor 247 to a condition-responsive device 248 of any desired type, for example, the type described in my copending application, Serial No. 631,339, filed September 1, 1932. This condition-responsive device is provided with metallic bellows and a progressive switch mechanism adapted to be connected to a multiple cable and to operate in a manner similar to the mechanism above described.

Adjustment of the adjusting switch 233 closes the circuit to the motor 121 through certain selected brushes 179 to 191 and the commutator 176, and thereby causes said motor to rotate said commutator in a direction and to an extent determined by the position of the switch 233, the movement being analogous to that of the commutator 156 caused in response to movement of the temperature-responsive device 14. The operation of the motor 121 causes movement of the arm 201 and of the beveled gear 110.

The relative position of the beveled gears 106 and 110 determines the position of the pinion 114 and consequently the position of the shaft 112. The arm 204, which is secured to the shaft 112, accordingly takes a position dependent upon the position of both gears 106 and 110, and thereby integrates the influence of the two condition-responsive devices 14 and 233.

The control linkage 192, which is operated by the arm 204, may be connected to a heat-control means, such as a steam valve 249, which is adapted to vary the pressure or quantity of steam supplied to the building or other unit being regulated. The valve 249 may, for example, have a control arm 250 to which the linkage 192 is adjustably secured. It is obvious, however, that the linkage 192 may be used with any other type of heat-control device.

It is to be understood that the gear trains interconnecting the motors 120 and 121 with worm gears 107 and 111 respectively may have different ratios, or the commutators 156 and 176 may be so related to their cooperating brushes as to obtain different angular ranges of movement, depending upon the differential control which is desired. In the embodiment illustrated in the drawings, the two commutators are adapted to have a ratio of movement of 10 to 4. One unit may, for example, move the common arm 90° and the other unit may move the arm through an arc of 36°, making a total swing of 126°. Either unit may, therefore, move the arm 204 forward or backward through its range, thereby producing integrated control by the combined plus or minus action of the two units. The 90° unit may be operated by the weather integrator, as above described, and the 36° unit by the adjusting switch 233.

The above-described system is adapted to control the heat supply in accordance with the outside temperature alone on a windless night. When exposed to the sunlight, however, the direct rays of the sun raise the temperature of the housing 17 an amount determined by the difference between the absorbed radiant heat and the loss due to convection to the surrounding air. The residual effect is passed to the air within the housing and causes the operation of the bellows 67 to be modified by an amount proportional to the heating effect of the sunlight. These two factors, together with the wind velocity, are integrated by the above device to provide a simple and accurate control of the heat supply, which may be used, for example, in connection with a central heating plant supplying a plurality of buildings or supplying a large building, the different parts of which are exposed to different weather conditions.

As applied to a building or to a building unit, the device may be used to supply a quantity of steam, which is accurately controlled in accordance with outside weather conditions to meet the heat requirements of the day. A substantially constant temperature may thus be obtained without changing the setting of the individual radiators.

This invention provides a control which may be used to control one or a plurality of heat-supply means, such as steam lines. The different steam lines may be individually controlled by separate units operated in parallel from the weather-responsive device. The adjusting switch 233 permits the range of operation of the motor-control unit to be adjusted manually from a point remote from the unit without disturbing the normal operation thereof. This enables the operator to compensate for unusual conditions or to eliminate irregularities in operation of the device.

The limiting control may also be obtained automatically from the thermostat 248. For this purpose the thermostat 248 may be located at some central point, such, for example, as a corridor or auditorium, so as to be responsive to irregularities in temperature and to act as a limiting control for the weather integrator.

It is to be understood that the manual switch and the inside thermostat may be used interchangeably and may be plugged into the sockets 212 of the various motor-control units at will; also, that any desired number of control units may be operated in parallel from either the manual switch 233 or the thermostat 248.

Operation of several units in parallel may be useful in controlling the steam to several buildings or to several parts of a large building from a single control device.

Obviously, if control by outside weather conditions alone were required, the control would be taken from the arm 171 instead of from the arm 204, or if control in accordance with inside temperature alone were required, the control would be taken from the arm 201 of the unit connected to the inside thermostat.

The control system may also be applied to various other uses. For example, it may be used to control an air-conditioning apparatus in accordance with both outside and inside conditions.

It may also be applied to fresh air and recirculating heating combinations to control, for example, the recirculated air in accordance with the inside temperature, the fresh air in accordance with the outside weather, and the heat supply in accordance with the combined effect of outside and inside conditions, the arms 201, 171 and 204 respectively being used for the control.

In certain instances, a simplified control may be obtained by utilizing the system illustrated in Figure 14, in which unit M represents the double motor-control unit shown in Figures 4 to 8. One side of this unit may be connected by a multiple cable 251 to a multiple socket 252 of a thermostatic device 253, which is diagrammatically illustrated as comprising an expansible bellows 254, adapted to operate a lever 255 in accordance with the pressure of the medium therein. The action of the bellows 254 is opposed by balancing bellows 256, which resiliently engages the arm 255.

The interior of the bellows 254 may be connected by a tube 257 to a bulb 258, which may be inserted between the inside wall 259 and the outside wall 265 of a building, as shown in full lines, or on the inside of the wall 265, as shown in dotted lines 258A, or on the outside of the wall 265, as shown in dotted lines at 258B. In the first position, the bulb is influenced by the outside wall temperature and by the inside temperature. In the position 258A, the influence is only responsive to the outside wall temperature, which is dependent upon the outside temperature and also to some extent upon the wind and sunlight to which the wall is exposed. The bulb accordingly reflects indirectly the outside weather conditions and produces corresponding operation of the bellows 254. In certain instances, it may be desired to operate one section of the double motor-operated unit M in accordance with the outside temperature alone. This is accomplished by positioning the bulb shown at 258B where it is exposed to outside temperatures only, or by using any other suitable thermostatic control device. In each of the above instances, the second part of the motor-control unit may be connected to an indoor thermostat 266 similar to that described in my copending application above mentioned. It is also to be understood that various other types of temperature and weather-responsive elements having reversing and progressive contacts may be employed, if desired.

Although certain embodiments of the invention have been disclosed for purposes of illustration, it is to be noted that the various parts thereof may be varied without departing from the spirit of the invention and that the invention is only to be limited in accordance with the following claims when interpreted in view of the prior art.

I claim:

1. In a condition-control system, a motor-control unit comprising a differential means having a pinion and a pair of beveled gears cooperating therewith, a control means adapted to control said condition operated by said pinion, commutators associated with the respective beveled gears, and a reversible motor means adapted to actuate each of said beveled gears, each reversible motor means comprising an armature associated with pole pieces carrying opposed shading coils adapted to be selectively energized for controlling the direction of rotation of the armature, and means including said commutators to selectively energize said shading coils and to determine the extent of movement of said armatures in response to different functions of said condition.

2. A condition control system comprising a differential having a pair of beveled gears and a pinion, motor means for actuating the respective beveled gears, control means associated with said pinion, independent means adapted to actuate the respective motor means, one of said independent means comprising a thermostat, a member movable in response to wind pressures to modify the action of said thermostat, and means adapted to absorb radiant heat from the sun's rays and to dissipate a portion thereof and to modify the action of said thermostat by the residual effect of the heat thus absorbed.

3. A condition control system comprising a differential having a pair of beveled gears and a pinion, motor means for actuating the respective beveled gears, control means associated with said pinion, independent thermostatic means adapted to actuate the respective motor means, a member movable in response to wind pressures to modify the action of one of said thermostatic means, and means adapted to absorb radiant heat from the sun's rays and to dissipate a portion thereof and to modify the action of said last thermostatic means.

4. A condition-control system comprising a differential having a pair of beveled gears and a pinion, motor means for actuating the respective beveled gears, control means associated with said pinion, independent thermostatic means adapted to actuate the respective motor means, and a member movable in response to wind pressures thereon adapted to modify the operation of one of said thermostatic means.

5. In combination, a plurality of temperature-responsive means, means responsive to the joint action of said temperature-responsive means, condition-control means actuated by said last means, and a member movable in response to wind pressure to modify the action of one of said temperature-responsive means in accordance with said wind pressures.

6. In combination, a heat-supply means, means responsive to variations in outside temperatures adapted to control said heat-supply means, a member movable in response to wind pressure adapted to vary the heat supply, means adapted to absorb the radiant heat of the sun's rays and to dissipate a portion thereof so that a residual effect is proportional to the change in heat requirements caused by said heat rays, and means to modify the action of said first means in accordance with said residual effect.

7. In combination, a heat-supply means, means responsive to variations in outside temperatures adapted to control said heat-supply means, a member movable in response to wind pressure adapted to vary the heat supply, means adapted to absorb the radiant heat of the sun's rays and to dissipate a portion thereof so that a residual effect is proportional to the change in heat requirements caused by said heat rays, means to modify the action of said first means in accordance with said residual effect, and means responsive to variations in inside temperatures to further modify the action of said heat-supply means.

8. In combination, a heat-supply means, means progressively and reversibly responsive to variations in outside temperatures adapted to modulate said heat-supply means, and a member movable in response to an increase in wind pressure to increase the heat supply and vice versa.

9. In combination, a heat-supply means, means progressively and reversibly responsive to variations in outside temperatures adapted to modulate said heat-supply means, a member movable in response to variations in wind pressure adapted to modify said temperature responsive means, means adapted to absorb radiant heat from the sun's rays and to dissipate a portion thereof so that the residual effect is proportional to the change in heat requirements caused by said rays, and means to modify the action of said temperature responsive means in accordance with said residual effect.

10. In combination, a heat-control means, reversible motor means adapted to progressively actuate the same, a positioning commutator associated with said reversible motor means, thermostatic means including reversing and progressive switch means, said switch means being operatively connected to said commutator and adapted to actuate said motor, and means movable in response to wind pressure to modify the action of said switch means.

11. A temperature-control system comprising, in combination, a source of heat supply, a differential having a pair of beveled gears and a pinion, motor means for actuating the respective beveled gears, means associated with said pinion to control said heat supply, means responsive to outside temperature adapted to actuate one of said motors, and remote manual-control means adapted to actuate the other of said motors to thereby provide a master control for adjusting the range of control of the temperature-responsive means.

12. A temperature-control system comprising, in combination, a source of heat supply, a differential having a pair of beveled gears and a pinion, motor means for actuating the respective beveled gears, means associated with said pinion to control said heat supply outside and inside, thermostatic means adapted to actuate the respective motor means, and a shield associated with said outside thermostatic means to absorb radiant heat from the sun's rays and to dissipate a portion of said heat whereby the residual effect on said thermostatic means is proportional to the change in heat requirements caused by said rays.

13. A temperature-control system comprising, in combination, a source of heat supply, a differential having a pair of beveled gears and a pinion, motor means for actuating the respective beveled gears, means associated with said pinion to control said heat supply, means responsive to outside temperature adapted to actuate one of said motors, and an inside thermostat adapted to actuate the other of said motors for providing a fine adjustment of the heat supply.

HAZOR J. SMITH.